United States Patent [19]

Bower, Jr. et al.

[11] 4,372,708
[45] Feb. 8, 1983

[54] RESIN CAPSULE AND METHOD FOR GROUTING ANCHOR ELEMENTS IN HOLES OF VARIOUS LENGTHS

[75] Inventors: Arnold B. Bower, Jr., Bristol, Va.; Robert E. Dillon, Ballston Lake, N.Y.

[73] Assignee: General Electric Company, Detroit, Mich.

[21] Appl. No.: 182,133

[22] Filed: Aug. 28, 1980

[51] Int. Cl.³ .................................................. E21D 20/02
[52] U.S. Cl. ........................................ 405/261; 206/219; 405/260
[58] Field of Search ................. 206/219, 220, 820; 85/15; 405/261, 260

[56] References Cited

U.S. PATENT DOCUMENTS

| 2,343,064 | 2/1944 | Kjorsvik | 206/820 X |
| 3,189,227 | 6/1965 | Hobbs et al. | 206/820 X |
| 3,650,298 | 3/1972 | Delmar | 206/820 X |
| 3,705,646 | 12/1972 | Jankowski et al. | 206/219 |
| 3,737,027 | 6/1973 | Ball | 206/219 |
| 4,103,771 | 8/1978 | Klatt et al. | 206/219 |
| 4,197,983 | 4/1980 | Raudys et al. | 229/65 |
| 4,223,043 | 9/1980 | Johnson | 206/820 |

*Primary Examiner*—Dennis L. Taylor
*Attorney, Agent, or Firm*—Hedman, Casella, Gibson & Costigan

[57] ABSTRACT

A two component resin capsule is disclosed for grouting an anchor element in a predrilled hole. More specifically, a flexible resin capsule is provided which may be wound on a reel and fed into a predrilled hole of any length. The resin capsule includes a plurality of pairs of sealing clips which enable the capsule to be severed intermediate any one of these pairs, thereby providing a capsule having a length corresponding to the length of the predrilled hole. The resin capsule, formed from a frangible material, includes a resin and a hardener housed in discrete compartments. The capsule is placed in a bolt hole such that when an anchor bolt is inserted, the capsule ruptures enabling the contents to mix and harden thereby achieving a secure resin bolting system.

10 Claims, 3 Drawing Figures

RESIN CAPSULE AND METHOD FOR GROUTING ANCHOR ELEMENTS IN HOLES OF VARIOUS LENGTHS

This invention relates to a resin capsule and a method for grouting anchor elements in holes of various lengths. More specifically, a resin capsule is provided which consists of a tubular member formed from a frangible material, and includes two discrete compartments therein for holding a resin and a harder component respectively. The tubular member is provided with a plurality of pairs of sealing clips disposed therealong at spaced intervals enabling the tubular member to be severed at a point intermediate the clips of any pair. By this arrangement, a resin capsule of any desired length may be readily produced at the drilling site.

BACKGROUND OF THE INVENTION

In standard mining operations, openings are made to expose veins of coal or precious metals. In order to reduce the likelihood of an opening collapsing, which in turn, increases the safety of the miners, various systems have been devised to secure the roof of the opening. At the present time, one of the preferred methods of shoring up roofs includes the affixing of plates or boards onto the mine roof which function to support the roof thereby preventing its collapse. In order to affix roof plates or boards to the mine roofs, holes are drilled in the mine roofs with roof bolting machines. Thereafter, bolts are inserted through holes provided in the plates and are then secured in the holes to affix the plates to the roof. The bolts themselves may be secured within the holes by mechanical means. However, when the holes are drilled in friable material such as coal, which is subject to crumbling, it is preferable that a grouting system be used to stabilize the friable material which results in a secure bolting system.

In conventional roof bolting operations, in order to reduce coats, it is preferable to utilize standardized length bolts, and to drill corresponding depth bolt holes. Common grouting systems include the use of a polyester resin and a hardener as a catalyst which may be mixed at the drilling site and pumped into the drilled hole prior to the insertion of the bolt. In order to simplify the task of the operator, various resin capsules have been developed which contain pre-measured quantities of the resin and hardener such that no premixing at the site is necessary. More specifically, resin capsules have been developed which include discrete compartments for housing both the hardener and a resin, respectively. The resin capsules are of a fixed length corresponding to the bolt length and hole depth. In operation, the resin capsule is loaded into the hole and thereafter a bolt is inserted, which functions to rupture the frangible walls of the capsule. Thereafter the bolt is rotated enabling the contents of the capsule to mix and harden to form a two-part plastic system. By this arrangement, the friable walls of the drilled hole are stabilized and a secure bolting system is achieved.

Recently, due to changing economics and the increasing need to augment domestic energy sources, coal is being mined in areas where it was heretofore considered impractical. More particularly, mining is being carried out where smaller veins of coal are to be found. In such cases, it is impractical to provide opening height common when high veins of coal are mines. Thus, roof bolting drills have been developed which are used for "low coal" and can operate in openings which are as little as three feet in height. As can be appreciated, it is extremely difficult to work with longer six foot bolts and six foot resin packages in openings which are only three feet in height. Accordingly, when roof bolting in "low coal", bolt holes are drilled to a depth required for proper roof support. The actual length of a particular drilled hole may vary from two to six feet depending upon the support requirements, the relative strength of the roof materials, and the number of bolts used per square foot. When drilling holes longer than slam height, the standard resin capsule cannot be used, and a viable substitute must be found. The substitute should be capable of use in holes drilled to a variety of different lengths, and should avoid the problems associated with the on-site premixing of components.

Accordingly, it is an object of the subject invention to provide a new and improved resin capsule for grouting an anchor element is predrilled holes of various lengths.

It is a further object of the subject invention to provide a resin capsule consisting of a tubular member having a plurality of pairs of sealing clips disposed therealong at spaced intervals whereby the tubular member may be severed at a point between the clips of any one of the pairs to provide a resin capsule of the desired length.

It is another object of the subject invention to provide a resin capsule which is relatively flexible and may be wound on a reel for mounting on a conventional roof bolting drill to facilitate the placement of the capsule in the drilled hole.

It is still a further object of the subject invention to provide a new and improved method for fixing anchor bolts in bolt holes utilizing the novel resin capsule of the subject invention.

BRIEF DESCRIPTION OF THE INVENTION

According to the present invention there is provided a new and improved resin capsule for grouting an anchor element in holes of various lengths. The resin capsule consists of a tubular member which is formed from a pliable frangible material and has two discrete compartments formed therein. A polyester resin is stored in one of the discrete compartments while a hardener component is housed in the other compartment. The hardener and resin are provided in premeasured quantities to effect maximum hardening in a minimum amount of time.

In order to enable the resin capsule to be used in holes of various lengths, a new and improved sealing means is provided. More particularly, a plurality of pairs of sealing clips are diposed at spaced intervals along the tubular member. Preferably, the pairs are spaced at one foot intervals such that the resulting capsules will conform to standard bolt lengths. The flexible capsule may be wound around a rotatable reel and mounted on a roof bolting drill. In operation, after a hole has been drilled in the mine roof, a portion of the resin capsule is unwound from the reel and loaded into the hole. After a sufficient length of the capsule has been loaded, the capsule is severed at a point intermediate the clips of the pair adjacent the open end of the hole. Since pairs of clips are provided, both the portion of the capsule left in the hole, and the portion of the capsule remaining on the reel remain sealed. A bolt corresponding to the length of the hole is then inserted into the hole which functions to rupture the frangible walls of the capsule and enables the resin and hardener to mix. The bolt may be rotated to insure the full and adequate mixing of the components. The resin and catalyst will harden into a two-part plastic system which stabilizes the friable walls of the hole and secures the bolt and plate to the mine roof. As is apparent, the above described method can be utilized for holes of various lengths. More particularly, since the new and improved resin capsule of the subject invention provides for a plurality of sealing means disposed at spaced intervals, a resin capsule may be readily formed by severing the capsule between the clips of any pair to produce a capsule of the desired length.

DESCRIPTION OF THE PREFERRED EMBODIMENT

Figure 1:
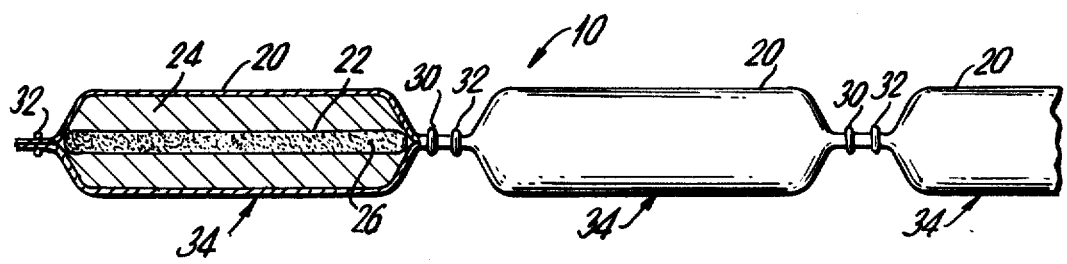
FIG. 1 is an elevational view, partially in section, of the new and improved resin capsule of the subject invention.

Turning specifically to FIG. 1, the resin capsule 10 of the subject invention is illustrated, and is defined by an outer tubular membrane 20 having a generally circular cross section. The tubular membrane 20 is formed from a pliable, frangible material, preferably a synthetic plastic film consisting of polyethylene, polypropylene, or polyvinyl chloride. A longitudinally extending inner tubular membrane 22 is provided to divide the interior of the capsule 10 into two discrete compartments. In the alternative, a single wall membrane (not shown) may be provided, which extends transversely across the interior of the tube, and defines two discrete, semi-circular compartments.

As illustrated in FIG. 1, a resin component 24 is provided and is disposed in the radially outermost discrete compartment of the capsule 10. The inner compartment, defined by the inner membrane 22, contains a catalyst or hardener 26. The relative size of the internal compartments permits the compartments to be filled with premeasured amounts of resin 24 and catalyst 26, such that a proper mixing ratio is obtained when the membranes are ruptured, for fast uniform and complete hardening. Any conventional resin may be employed such as ethylene glycol, propylene glycol, or diethylene glycol maleates. The resin portion may further include unsaturated dicarboxylic acids and their anhydrides and in addition, cross linking substances such as styrene. The hardener or catalyst 26 may contain for example, peroxide organic acids to promote the cross linking reactions.

The resin capsule 10 of the subject invention may be formed in a continuous manner wherein the tubular membranes are extruded or drawn. The membranes can be charged with the hardener and resin as they are being formed. Thereafter, and in accordance with the subject invention, a plurality of pairs of sealing means are provided at spaced intervals along the resin capsule 10. The sealing means may include string ties, wires, or in a preferred embodiment and as illustrated in FIG. 1, annular metal clips 30, 32. The clips 30, 32 have a relatively small inner diameter such that the resin capsule 10 is constricted thereby defining a plurality of linked, capsule members 34.

In order to achieve the maximum utility for the resin capsule 10, it is preferred that the paired clips 30, 32 be spaced along the capsule at one foot intervals. For example, by placing the clip pairs relatively close together, the entire resin capsule 10 becomes relatively flexible, enabling the capsule to be wound around a reel which is associated with the roof bolting drill (not shown). The wrapping of the resin capsule around a rotatable reel, enables the capsule to be readily unwound and fed into a bolt hole with relative ease, thereby increasing production speeds. In addition, and as more fully described hereinafter, by spacing the paired clips at one foot intervals, sealed resin capsules having a size corresponding to standard bolt sizes (i.e., 2, 3, 4 feet etc.) may be readily produced at the work site.

Figure 2:
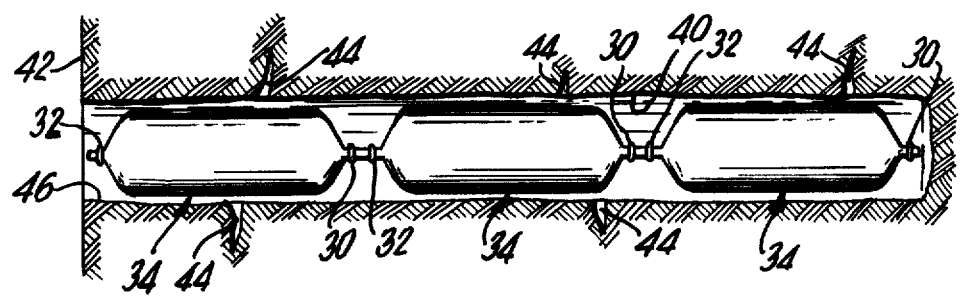
FIG. 2 is a cross sectional view of a drilled hole illustrating the resin capsule of the subject invention located therein.

In operation, a roof bolting drill is used to drill a bolt receiving hole 40 in the mine roof 42, as illustrated in FIG. 2. When drilling is friable materials such as coal, the resultant hole 40 may exhibit numerous internal cracks or fissures 44 which would tend to weaken the roof. Typically, in a low coal operation, a bolt hole of less then six feet will be drilled. In the example illustrated in FIG. 2, a bolt hole 40 of approximately three feet is shown.

After the hole 40 is drilled, a portion of the resin capsule 10 is inserted into the hole 40 until the hole is substantially filled, thereby providing a sufficient amount of resin and hardener. As illustrated in FIG. 2, preferably a three foot length of the resin capsule consisting of three tubular members 34 is loaded into the hole 40. Thereafter, the resin capsule 10 is severed to define a portion corresponding to the desired length. More particularly, a cutting means associated with the resin bolting drill severs the resin capsule 10 at a point intermediate the pair of clips 30, 32 which is adjacent the open end 46 of the bolt hole 40. The clip 32, associated with the free end of the portion of the resin capsule 10 which remains in the hole, functions to keep the contents housed therein from prematurely spilling out and mixing. Further, the clip associated with the free end of the unused portion of the resin capsule 10 similarly functions to keep that portion sealed.

After the capsule members 34 are loaded in the hole 40, a bolt 50 may be inserted therein for the purpose of affixing a plate 52 to the mine roof for structurally supporting the roof to prevent its collapse. The bolt 50 consists of an elongated cylindrical shaft portion 54 having a tapered or flat end 56 and a plurality of annular knurls or projections 58 spaced therealong. The head of the bolt 50 is provided with a noncircular head portion 60 to facilitate its rotation by the roof bolting apparatus.

Figure 3:
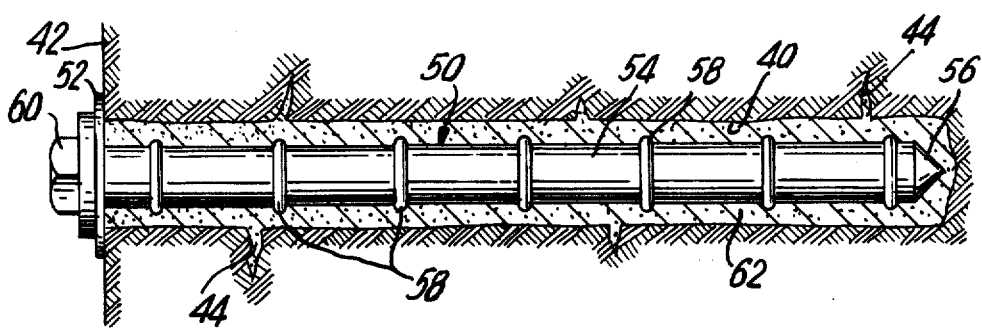
FIG. 3 is a view similar to FIG. 2 after insertion of a bolt into the hole.

The insertion of the bolt 50 into the bolt hole 40 functions to rupture the frangible membrane 20 of the resin capsule 10 thereby causing the resin 24 and the catalyst 26 to mix. Preferably, the bolt 50 is rotated, while it is inserted or immediately thereafter, to effectuate the complete mixing of the resin and catalyst. In a short period of time, the mixture will solidify into a hardened two-part plastic system 62 which, as illustrated in FIG. 3, rigidly secures the bolt 50 within the bolt hole 40. In addition, the hardened plastic system 62 functions to fill the cracks 44 in the hole and thus, forms a secure bond between the walls of the bolt hole and the bolt 50. The annular projections 58 of the bolt 50 cooperate with the two-part plastic system 62 to provide additional strength to the bond. The securely affixed bolt 50 functions to hold plate 52 against the mine roof 42 which thereby minimizes the likelihood of roof collapse.

During the continuing roof bolting operation, it is often convenient to drill a subsequent bolt hole to a depth, greater than or less than, the length illustrated in FIGS. 2 and 3 of the drawings. In accordance with the subject invention, the resin capsule may be readily adapted for use with a variety of bolt hole sizes. For example, when a four foot length of hole is drilled, four capsule members 34 are loaded into the hole. Thereafter, the resin capsule 10 is merely severed between the clips of the pairs 30, 32 adjacent the open end of the hole, in preparation for the insertion of the bolt. A four foot bolt is then inserted and rotated in the same manner as described above.

Accordingly, there is disclosed a new and improved resin capsule and a method for using the same for grouting anchor bolts in holes of various lengths. In summary, a resin capsule, formed from a pliable, frangible material, is provided and includes discrete inner compartments for housing a resin and catalyst. The resin capsule further includes a plurality of pairs of sealing clips, disposed at spaced intervals therealong such that the capsule may be severed at a point between the clips of any pair to obtain a sealed capsule portion of the desired length.

It is to be understood that changes may be made in the particular embodiment of the invention in light of the above teachings, and that these will be within the full scope of the invention as defined by the appended claims.

We claim:

1. A two component resin capsule adapted to be inserted in drilled holes of standard or non-standard lengths in conjunction with anchor bolting systems comprising:
    an elongated tubular member formed from a pliable frangible material having two discrete compartments therein;
    a resin component in one of said discrete compartments;
    a hardener component disposed in the other of said discrete compartments; and
    a plurality of pairs of sealing means disposed along the length of said tubular membrane at spaced intervals such that said tubular membrane forms a plurality of interconnected sealed capsules, whereby a variable number of said sealed capsules may be inserted into said hole, and said two component resin capsule may be severed intermediate a selected pair of sealing means to selectively obtain a sealed portion of said two component resin capsule of variable length sufficient to fill said drilled hole.

2. A resin capsule as recited in claim 1 wherein each said sealing means is a clip.

3. A resin capsule as recited in claim 2 wherein said clips are formed of metal and are annular in configuration.

4. A resin capsule as recited in claim 1 wherein said tubular membrane has a substantially circular cross-section.

5. A resin capsule as recited in claim 1 wherein said pairs of sealing means are spaced apart at one foot intervals.

6. A resin capsule as recited in claim 1 wherein said hardener holding compartment is defined by an inner elongated, centrally located tubular membrane.

7. A resin capsule as recited in claim 1 further including a reel means, and with said resin capsule being wound around said reel means.

8. A resin capsule as recited in claim 1 wherein said tubular membrane is formed from a synthetic plastic film.

9. A method of fixing anchor bolts in drilled holes of standard or non-standard lengths comprising the steps of:
    providing a tubular, two component resin capsule having a pliable, frangible outer membrane and including two discrete compartments therein, with one of said compartments holding a resin component and with the other of said compartments holding a hardener component, said resin capsule further including a plurality of pairs of sealing means disposed along said tubular member at spaced intervals such that said tubular membrane forms a plurality of interconnected sealed capsules;
    inserting a variable number of said sealed capsules into said drilled hole until said drilled hole is sufficiently filled with a selectively variable length of said resin capsule;
    severing said resin capsule intermediate the pair of said sealed means adjacent the open end of said hole leaving a sealed capsule on either side of the severance; and
    inserting a bolt into said drilled hole to rupture said frangible container and rotating said bolt to thoroughly mix the components therein to form a secure anchor bolt system.

10. A method of fixing anchor bolts in drilled holes of standard or non-standard lengths comprising the steps of:
    providing a tubular, two component resin capsule having a pliable, frangible outer membrane and including two discrete compartments therein, with one of said compartments holding a hardener component, said resin capsule further including a plurality of pairs of sealing means disposed along said tubular member at spaced intervals such that said tubular membrane forms a plurality of interconnected sealed capsules;
    selectively severing said resin capsule intermediate the pair of said sealing means adjacent the open end of said hole leaving a variable number of sealed capsules on either side of the severance depending on the length of said hole;
    inserting said severed portion into said drilled hole; and
    inserting a bolt into said drilled hole to rupture said frangible container and rotating said bolt to thoroughly mix the components therein to form a secure anchor bolt system.

* * * * *